(12) United States Patent
Ikeda

(10) Patent No.: US 7,885,148 B2
(45) Date of Patent: Feb. 8, 2011

(54) DISC PROCESSING APPARATUS

(75) Inventor: Tomohiro Ikeda, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1123 days.

(21) Appl. No.: 11/337,108

(22) Filed: Jan. 19, 2006

(65) Prior Publication Data

US 2007/0280057 A1 Dec. 6, 2007

(30) Foreign Application Priority Data

Jan. 19, 2005 (JP) ............................ P2005-011424

(51) Int. Cl.
*G11B 23/38* (2006.01)
*G11B 17/00* (2006.01)

(52) U.S. Cl. .............. 369/30.34; 369/30.03; 369/30.24; 369/30.12

(58) Field of Classification Search .............. 369/30.24, 369/30.03, 30.12, 30.31, 30.32, 30.34, 30.36
See application file for complete search history.

(56) References Cited

U.S. PATENT DOCUMENTS

| | | | | |
|---|---|---|---|---|
| 2,726,088 A | * | 12/1955 | Da Costa | .................... 369/210 |
| 5,734,629 A | | 3/1998 | Lee et al. | |
| 6,034,926 A | * | 3/2000 | Dang et al. | ............... 369/30.34 |
| 6,490,232 B2 | * | 12/2002 | Sato | ........................ 369/30.34 |
| 7,349,294 B2 | * | 3/2008 | Lilland et al. | ............. 369/30.57 |
| 2003/0002400 A1 | * | 1/2003 | Klein | ....................... 369/30.55 |
| 2004/0022139 A1 | * | 2/2004 | Miller | ...................... 369/30.19 |

* cited by examiner

*Primary Examiner*—William J Klimowicz
*Assistant Examiner*—Andrew J Sasinowski
(74) *Attorney, Agent, or Firm*—Seed IP Law Group PLLC

(57) ABSTRACT

In a disc processing apparatus capable of automatically carrying out processing work such as recording information on a plurality of optical discs and printing label surfaces on those optical discs, this disc processing apparatus is able to suppress by separating a conveyed optical disc from an optical disc located just under the conveyed optical disc the occurrence of a phenomenon in which a plurality of optical discs is simultaneously conveyed in the state in which they stuck together when a plurality of optical discs accommodated within a stacker in the stacked state stuck together. After a disc contact portion 17c of a disc holding mechanism C1 was brought in contact with an optical disc D, the disc holding mechanism C1 is lowered by a predetermined amount to urge the disc contact portion 17c to downwardly press the optical disc D to thereby apply force directed in the direction substantially perpendicular to the disc surface to the optical disc D. Thus, the optical disc D located at the uppermost portion of a stacker 5 can be separated from an optical disc D located just under the above-mentioned optical disc D.

7 Claims, 12 Drawing Sheets

DISC PROCESSING APPARATUS

BACKGROUND OF THE INVENTION

1. Field of the Invention

The present invention relates generally to a disc processing apparatus, and particularly to a disc processing apparatus suitable for automatically executing processing work such as recording information on a plurality of optical discs and printing label surfaces on those optical discs.

2. Description of the Related Art

It has been customary to automatically mass-produce CDs (compact discs) and DVDs (digital versatile discs) which become recording media products on which music and movie were recorded so that manufacturing costs may be decreased. In order to meet with such requirements, a disc processing apparatus has been proposed, in which a recording unit for writing information on an optical disc, a printing unit for printing a label surface of an optical disc and a disc conveying unit for conveying an optical disc are formed as one body and in which a series of processing work to supply unprocessed optical discs and to collect optical discs finished as recording media products can be carried out automatically (see Cited Patent Reference 1, for example).

FIG. 1 of the accompanying drawings is a perspective view showing an external appearance of an optical disc processing apparatus according to the related art.

As shown in FIG. 1, an optical disc processing apparatus 101 described in the above-described Cited Patent Reference 1, by way of example, is mainly composed of a plurality of recording units 102 for recording information on an optical disc D, an inspecting unit 103 for inspecting whether or not information is recorded on the optical disc D properly, a printing unit 104 for printing information on the label surface of the optical disc D, a stacker 105 for accommodating therein unprocessed optical discs in the stacked state, a stacker 106 for accommodating therein processed optical discs in the stacked state, a stacker 107 for accommodating therein removed optical discs, judged as defective products by the inspecting unit 103, in the stacked state and a disc conveying unit 109 using a disc holding mechanism 108 to clamp the optical disc D and conveys it among the above-described respective units. The above-described stackers 105, 106 and 107 are fixed to a turntable 110 which is rotated. A certain stacker that should be required in the processing process of the optical disc D is located just under the disc holding mechanism 108 under control. Also, the recording unit 102, the inspecting unit 103 and the printing unit 104 are provided with disc trays 102a, 103a and 104a which can be loaded into and unloaded from the recording unit 102, the inspecting unit 103 and the printing unit 104 in response to load/unload instructions.

The optical disc D located on the uppermost portion of the stacker 105 is conveyed by a disc conveying unit 109 in the state in which it is clamped by the disc holding mechanism 108 and thereby placed on the disc tray 102a. Then, the recording unit 102 effects information record processing on the optical disc D. After the information record processing by the recording unit 102 was completed, the disc tray 102a is unloaded from the recording unit 102 and the optical disc D is again clamped by the disc holding mechanism 108. The optical disc D clamped by the disc holding mechanism 108 is placed on the disc tray 103a unloaded from the inspecting unit 103 by the disc conveying unit 109. Then, it is checked by the inspecting unit 103 whether or not information was properly recorded on this optical disc D. The optical disc D, which was judged by the inspecting unit 103 that information was recorded properly, is conveyed and placed on the disc tray 104a of the printing unit 104. After the label surface of this optical disc D was printed by this printing unit 104, the processed optical disc D is collected into the stacker 106.

Cited Patent Reference 1: U.S. Pat. No. 5,734,629

It is frequently observed that optical discs tend to stuck together after a plurality of optical discs accommodated within the stacker in the stacked state was left during a long period of time. In particular, in the case of a label printer-applicable-optical disc D in which it is assumed that suitable information such as images are to be printed on the label surface of the optical disc D, as shown in FIG. 2, since a printed surface (UV (ultraviolet) protecting layer) Db is provided near a central hole Da, it is unavoidable that this printed surface Db and an arc-like spacer Dc formed around the central hole Da stick together to cause these optical discs to stick together.

If the optical discs are sticking together, then when the optical disc is removed from the stacker prior to the information record processing, it is inevitable that the disc holding mechanism 108 holds the optical discs in which a plurality of optical discs stuck together. When the disc tray 102a is loaded onto the recording unit 102 in the state in which a plurality of optical discs is placed on the disc tray 102a of the recording unit 102, the recording unit 102 will become unable to correctly execute future processing operations.

SUMMARY OF THE INVENTION

In view of the aforesaid aspects, the present invention intends to provide a disc processing apparatus in which sticking optical discs can be separated from each other so that a phenomenon in which a plurality of optical discs is conveyed in the stuck state at the same time can be suppressed.

According to an aspect of the present invention, there is provided a disc processing apparatus which is comprised of a stacker for accommodating therein a plurality of disc-like recording mediums in the stacked state, a disc processing unit including a disc holding portion on which a disc-like recording medium is held and effecting predetermined processing on the disc-like recording medium held on the disc holding portion, a disc conveying unit including a disc holding mechanism for holding a disc-like recording medium located at the uppermost portion of the stacker and conveying the thus held disc-like recording medium to the disc holding portion of the disc processing unit by moving the disc holding mechanism and a separating means for separating the disc-like recording medium located at the uppermost portion of the stacker from a disc-like recording medium located just under the preceding disc-like recording medium.

In the disc processing apparatus according to the present invention, the separating means includes a disc contact portion which contacts with the disc-like recording medium located at the uppermost portion, the disc contact portion downwardly pressing the disc-like recording medium located at the uppermost portion to apply force directed in the direction substantially perpendicular to the disc surface to the disc-like recording medium located at the uppermost portion.

In the disc processing apparatus according to the present invention, the separating means includes a tapered portion which contacts with a peripheral edge of a disc-like recording medium located at the uppermost portion, the tapered portion pressing the peripheral edge of the disc-like recording medium located at the uppermost portion to apply force in the direction substantially parallel to the disc surface to the disc-like recording medium located at the uppermost portion.

According to another aspect of the present invention, there is provided a disc processing apparatus which is comprised of a stacker for accommodating therein a plurality of disc-like recording mediums in the stacked state, a disc processing unit including a disc holding portion on which a disc-like recording medium is held and effecting predetermined processing on the disc-like recording medium held on the disc holding portion, a disc conveying unit including a disc holding mechanism for holding a disc-like recording medium located at the uppermost portion of the stacker and conveying the thus held disc-like recording medium to the disc holding portion of the disc processing unit by moving the disc holding mechanism and control means for detecting that the disc holding mechanism holds a plurality of disc-like recording mediums within the stacker at the same time and controlling the disc conveying unit such that the disc conveying unit returns the thus held disc-like recording mediums to the stacker.

Further, the disc processing apparatus according to the present invention is further comprised of a reference position detecting means for detecting that the disc holding mechanism is located at predetermined position, a conveyance completion detecting means for detecting that the lower surface of the disc-like recording medium held by the disc holding mechanism contacts with the disc holding portion and wherein the control means detects a distance in which the disc holding mechanism is moved after the conveyance completion detecting means detected that the lower surface of the disc-like recording medium and the disc holding portion are contacted with each other since the reference position detecting means has detected that the disc holding mechanism was located at predetermined position and if a detected distance is less than a prescribed value, then it being judged by the control means that the disc holding mechanism held and conveyed a plurality of disc-like recording mediums at the same time.

According to the disc processing apparatus of the present invention, since disc-like recording medium accommodated within the stacker in the stacked state are conveyed for print processing and the like, since a disc-like recording medium to be conveyed is separated from a disc-like recording medium located just under the above-mentioned conveyed disc-like recording medium by the separating means, it is possible to suppress the occurrence of a phenomenon in which a plurality of disc-like recording mediums is conveyed in the state in which they are stuck.

Further, since the disc processing apparatus includes the control means for detecting that the disc holding means has held a plurality of disc-like recording mediums and controlling the disc conveying unit such that the disc conveying unit returns the thus held disc-like recording medium to the stacker, it is possible to avoid such a disadvantage in which a plurality of disc-like recording mediums is simultaneously conveyed to the disc processing unit in the state in which they stuck together so that processing in the disc processing unit is not carried out correctly.

DESCRIPTION OF THE PREFERRED EMBODIMENTS

A disc processing apparatus 1 according to the embodiments of the present invention will hereinafter be described with reference to the drawings. While the disc processing apparatus 1 according to the present invention may be completed by a combination of a plurality of mechanism elements, in order to understand the disc processing apparatus 1 more easily, the present invention will be described below with reference to also an outline of the whole of the arrangement.

Figure 1:
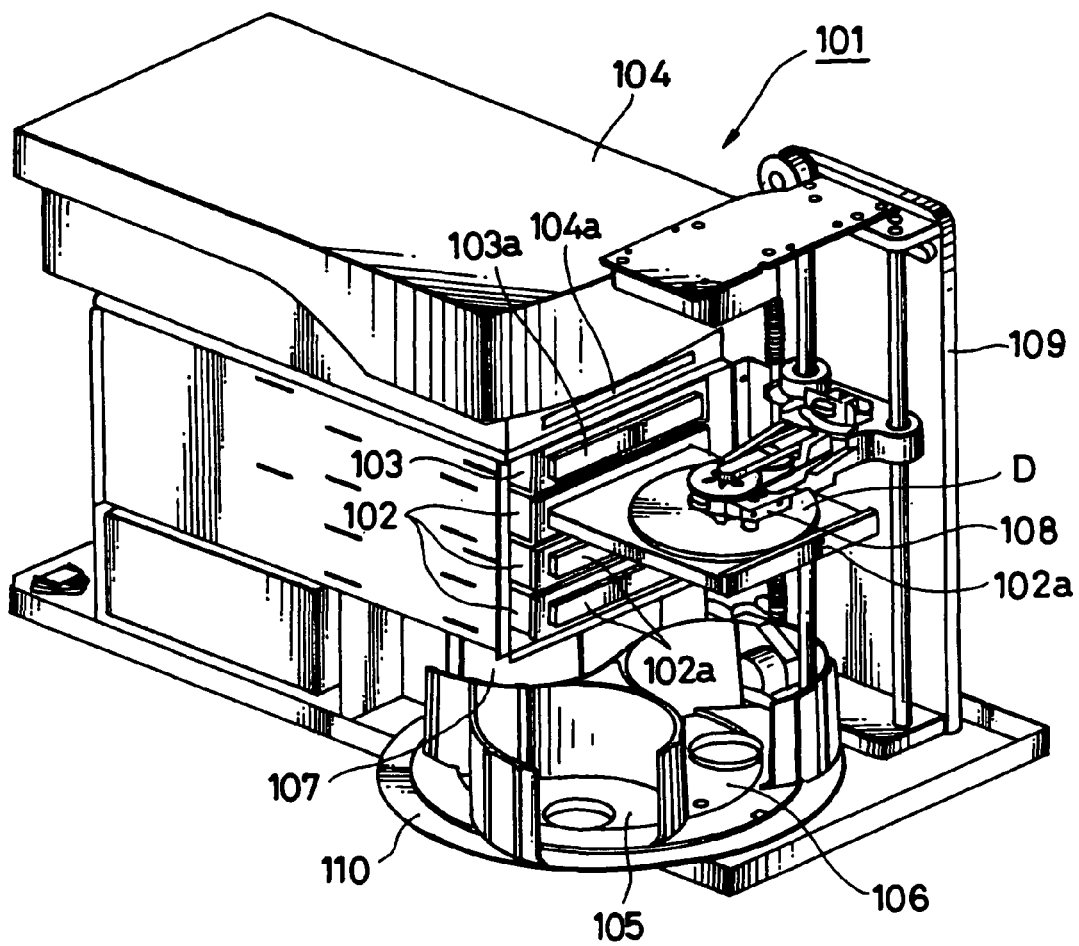
FIG. 1 is a perspective view showing an outside appearance of a disc processing apparatus according to the related art.
Figure 2:
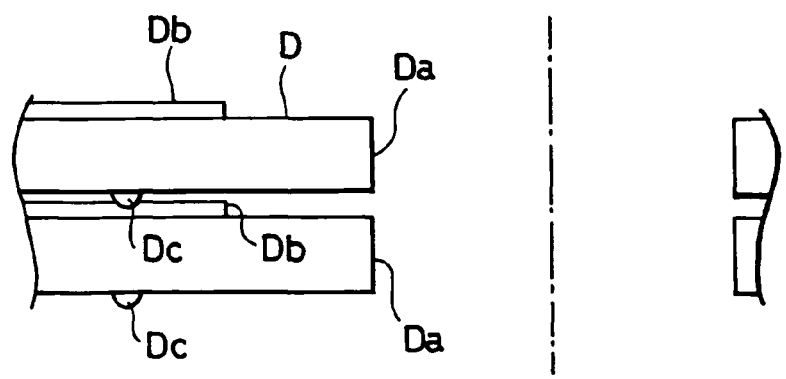
FIG. 2 is a side view to which reference will be made in explaining the state in which optical discs are sticking to each other according to the related art.
Figure 3:
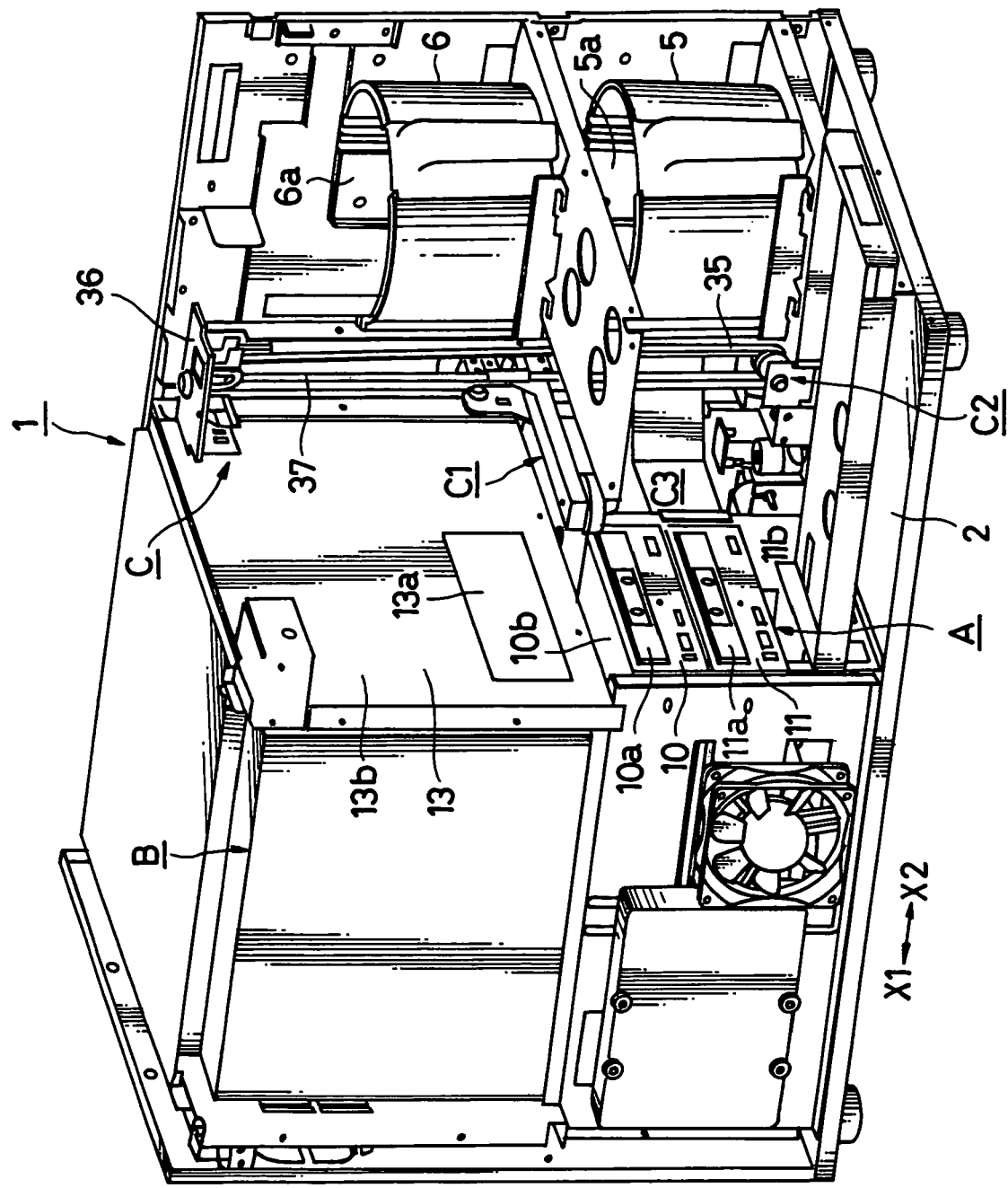
FIG. 3 is a perspective view showing an outside appearance of a disc processing apparatus according to the embodiment of the present invention.
Figure 4:
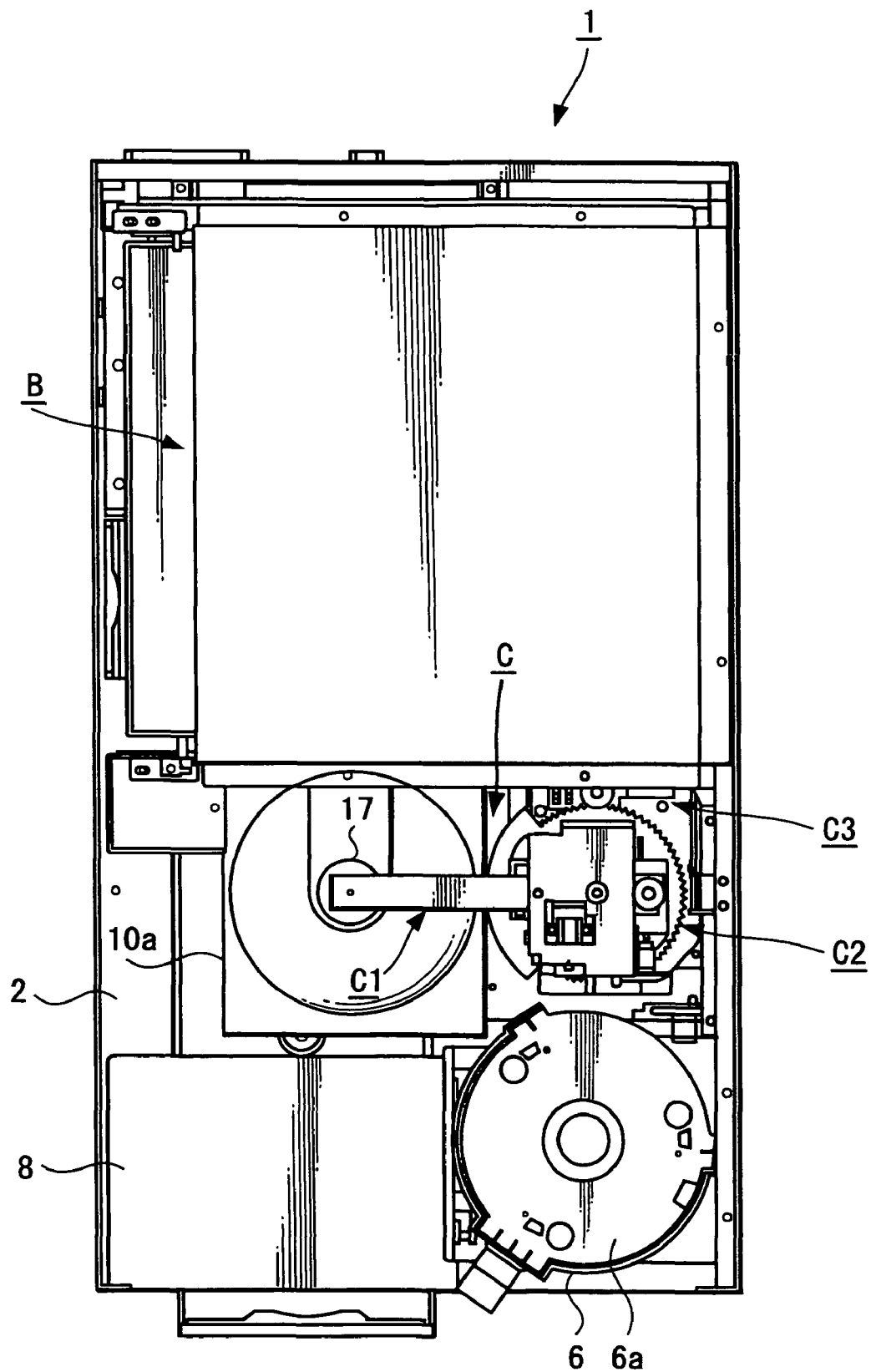
FIG. 4 is a plan view showing the disc processing apparatus shown in FIG. 3.
Figure 5:
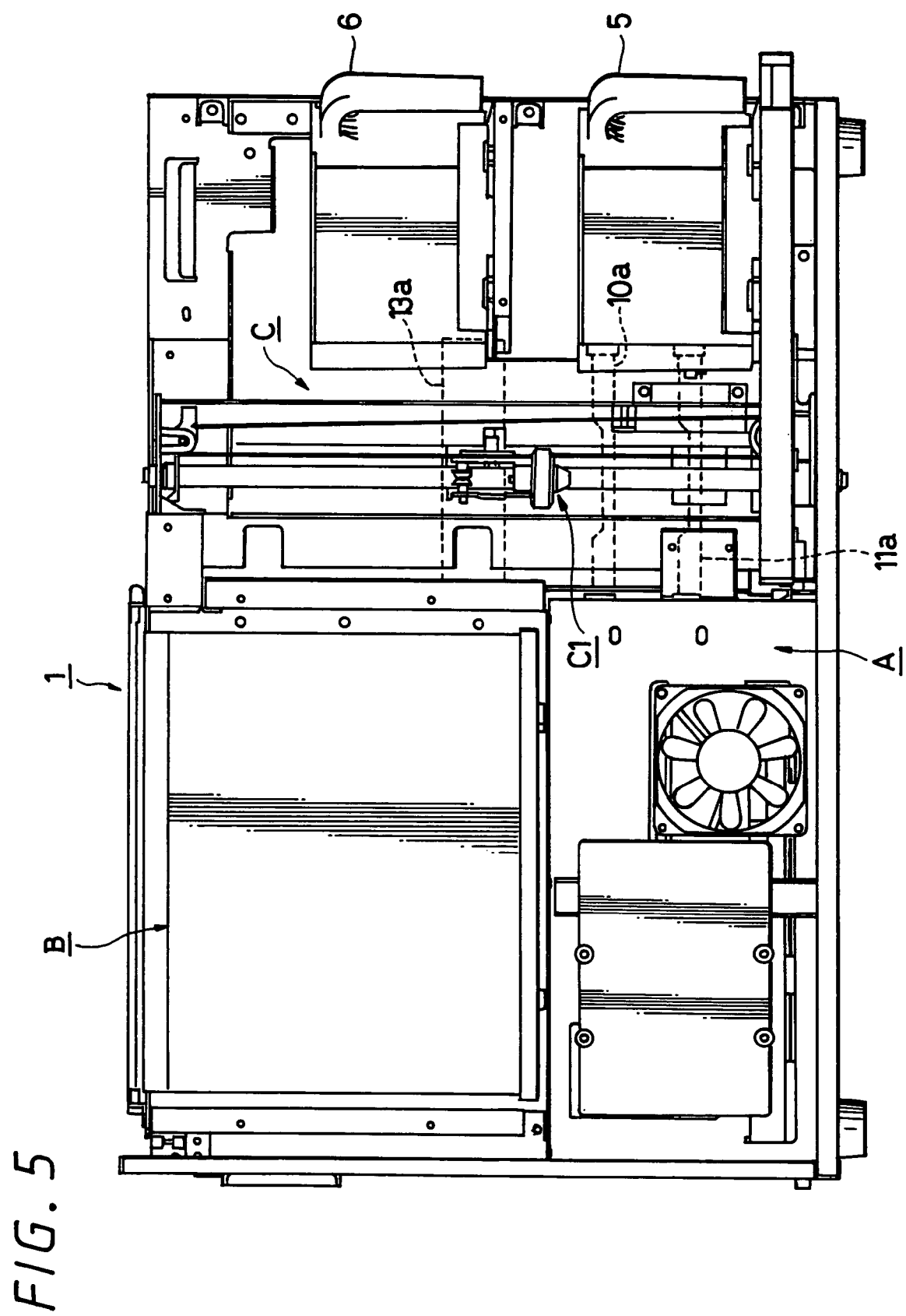
FIG. 5 is a left-hand side elevational view showing the disc processing apparatus shown in FIG. 3.

FIG. 3 is a perspective view showing the disc processing apparatus 1 according to the present invention, FIG. 4 is a plan view and FIG. 5 is a left-hand side elevational view thereof. As illustrated, the disc processing apparatus 1 is generally comprised of a case 2, a recording unit (disc processing unit) A, a printing unit (disc processing unit) B, a disc conveying unit C, a supplying stacker 5, a collecting stacker 6 and a control unit 8 (see FIG. 4) including a microcomputer, each of which being housed within the case 2.

The recording unit A is adapted to effect information record processing on an optical disc D and it is composed of well-known optical disc drives 10 and 11 located on the lower portion of the case 2. The two optical disc drives 10 and 11 have the identical arrangement and hence only the optical disc drive 10 will be described. As shown in FIG. 3, the optical disc drive 10 includes a disc tray 10a on which the optical disc D is held. When this disc tray 10a is inserted into and ejected from a case 10b, the optical disc D may be loaded into and unloaded from the optical disc drive 10. Then, the optical disc drive 10 includes a recording unit (not shown) for effecting information record processing on the thus loaded optical disc D.

The printing unit B is adapted to effect print processing on the label surface of the optical disc D and it is composed of a well-known thermal transfer type printer 13 located on the recording unit A. The thermal transfer type printer 13 includes a disc tray 13a on which the optical disc D is held. When this disc tray 13a is inserted into and ejected from the case 13b, the optical disc D may be loaded on and unloaded from the printing unit B. Then, the thermal transfer type printer 13 includes a printing unit (not shown) for effecting print processing on the label surface of the thus loaded optical disc D. The disc tray 10a of the optical disc drive 10, the disc tray 11a of the optical disc drive 11 and the disc tray 13a of the thermal transfer type printer 13 are provided in such a manner that they may be aligned in the vertical direction.

The supplying stacker 5 is a case made of resin to house therein unprocessed optical discs in the stacked state and it includes a housing portion 5a to house therein optical discs. Also, a collecting stacker 6 is a case made of resin to house therein processed optical discs D of which information record processing and print processing were ended in the stacked state. The supplying stacker 5 and the collecting stacker 6 are shaped in such a manner that they may be opened in the upper direction and X1 direction of the side walls. The optical discs D are inserted into and ejected from the supplying stacker 5 and the collecting stacker 6.

As illustrated, the disc conveying unit C is generally composed of a disc holding mechanism C1 to hold and move the optical disc D, an elevating mechanism C2 to raise and lower the disc holding mechanism C1 and a swing mechanism C3 to swing the disc holding mechanism C1. The disc conveying unit C may raise and lower the disc holding mechanism C1 with the optical disc D held thereon by the elevating mechanism C2 and it may swing the above disc holding mechanism C1 by the swing mechanism C3 to thereby convey the optical disc D to the arbitrary position. Arrangements of the disc holding mechanism C1, the elevating mechanism C2 and the swing mechanism C3 will hereinafter be described in detail.

Disc Holding Mechanism C1:

The disc holding mechanism C1 will be described with reference to FIGS. 6A and 6B. As illustrated, a loader arm 16 is supported at its one end to the elevating mechanism C2 and thereby elevated and lowered. A clamp head 17 and a movable head 18 are provided at the tip end of the loader arm 16. The clamp head 17 includes a plurality of click portions 17a and the edge of a central hole Da of the optical disc D is held by disc holding portions 17b formed on the click portions 17a. Also, the clamp head 17 includes disc contact portions 47c which are brought in contact with the upper surface of the optical disc D. The movable head 18 is composed of a fitting portion 18b having a tapered portion 18a and a shaft portion 18c joined to the fitting portion 18b. The movable head 18 is provided such that it can be moved up and down relative to the loader arm 16 and the clamp head 17. Also, a compression spring 19 is disposed within the clamp head 17 and the click portions 17a of the clamp head 17 and the movable head 18 are biased in the lower direction under spring force of this compression spring 19.

An oscillating plate 21 and a plunger solenoid 23 are provided on the upper surface side of the loader arm 16. The oscillating plate 21 is able to oscillate about a supporting point portion 21a and its tip end is connected to the shaft portion 18c of the movable head 18. The plunger socket 23 includes a movable piece 23a connected to the other end of the oscillating plate 21. When excited, this plunger socket 23 moves the movable piece 23a in the lower direction to oscillate the oscillating plate 21 in the counter-clockwise direction, thereby resulting in the movable head 18 joined to this oscillating plate 21 being elevated.

Also, the clamp head 17 has provided therein a microswitch 24 which is energized by depression of the optical disc D to generate an energizing signal when the disc contact portion 17c comes in contact with the upper surface of the optical disc D.

Figure 6A:
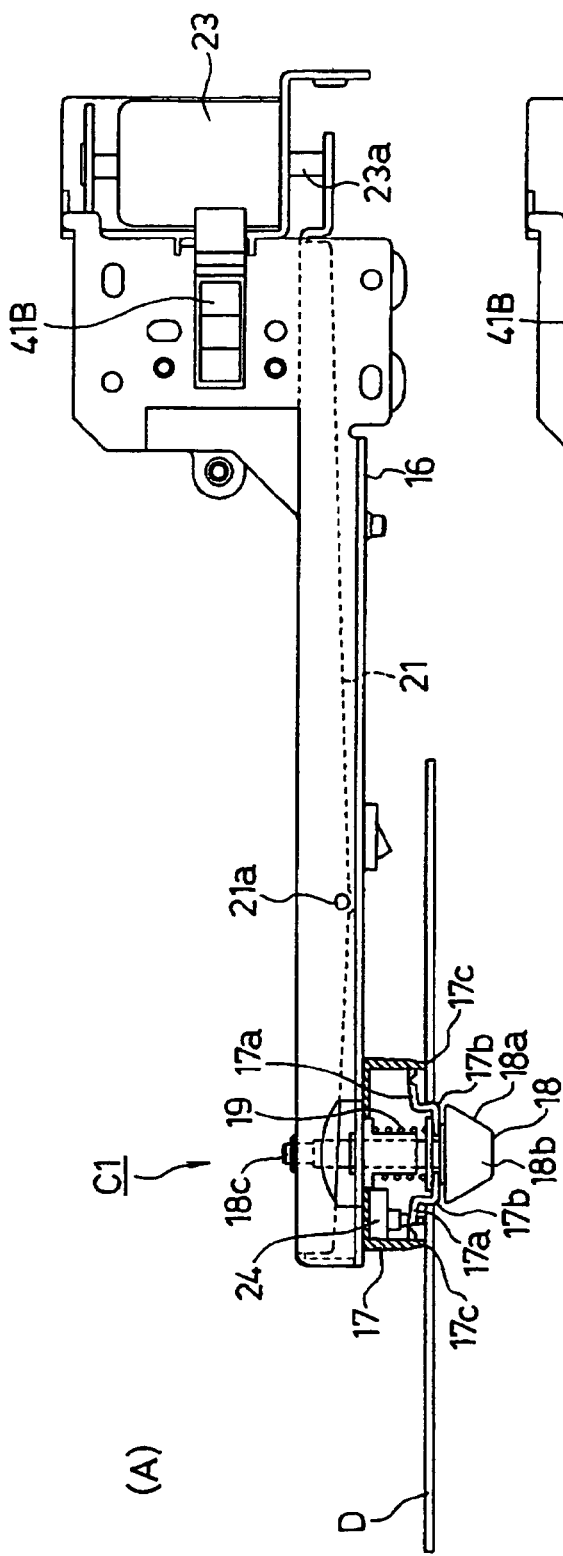
FIGS. 6A and 6B are side views to which reference will be made in explaining a disc holding mechanism of the disc processing apparatus, respectively.

In the disc holding mechanism C1 having the above arrangement, when the plunger solenoid 23 is not yet excited, as shown in FIG. 6A, the movable head 18 is located in the lower direction by spring-biasing force of the compression spring 19 and its own weight and the oscillating plate 21 joined to the movable head 18 is stopped at the position at which it was oscillated in the counter-clockwise direction in FIG. 6A. Also, the movable piece 23a of the plunger socket 23 joined to this oscillating plate 21 is located in the upper direction. Then, the click portions 17a of the clamp head 17 are displaced at its tip end side in the lower direction by spring-biasing force of the compression spring 19 and its own elasticity, whereby the disc holding portions 17b are displaced in the direction in which they are spaced apart from the center of the clamp head and projected from the fitting portions 18b to the outside. Specifically, in this state, the disc holding mechanism C1 holds the optical disc D by the disc holding portions 17b projected to the outside.

Figure 6B:
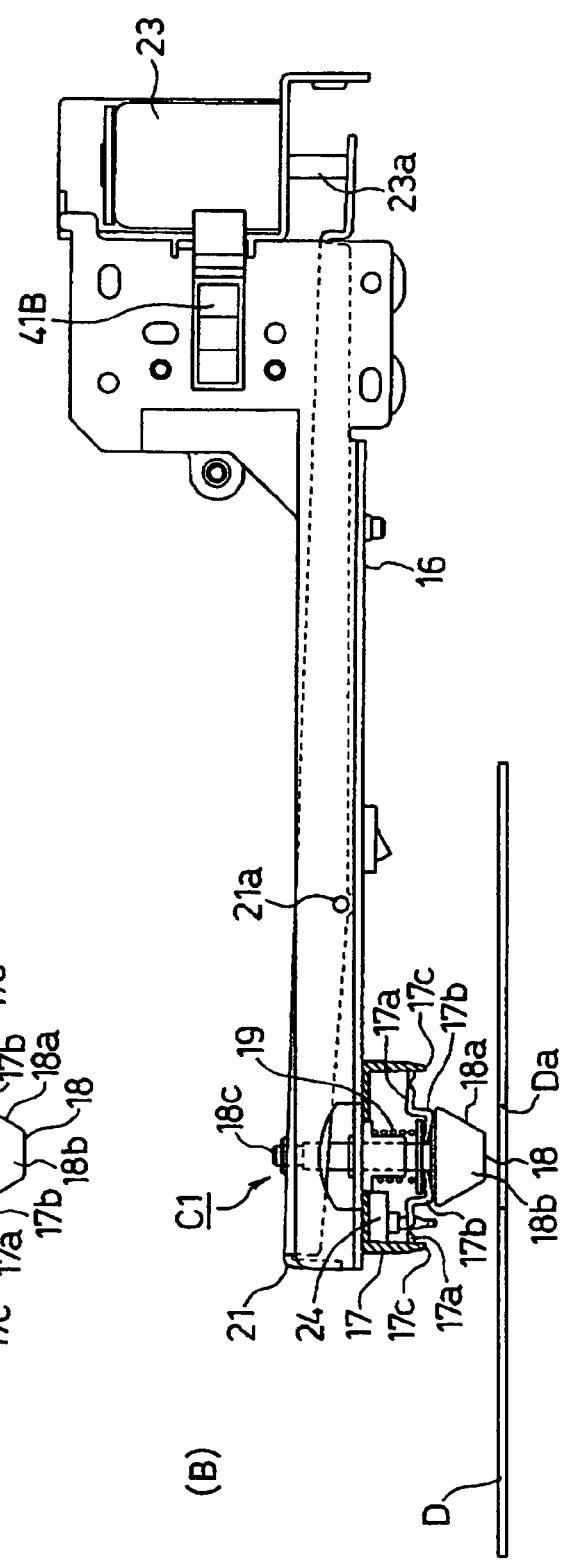

Then, when the plunger socket 23 is excited from the state shown in FIG. 6A, as shown in FIG. 6B, the movable piece 23a is displaced in the lower direction to oscillate the oscillating plate 21 joined to the movable piece 23a in the clockwise direction shown in FIG. 6B, whereby the movable head 18 joined to this oscillating plate 21 is displaced in the upper direction. As a result, a plurality of click portions 17a provided on the clamp head 17 are displaced in the upper direction as their tip end sides are raised by the fitting portions 18b of the movable head 18, whereby the disc holding portions 17b are displaced in the direction in which they may approach the center of the clamp head 17 and are placed in the state in which they are not projected from the fitting portions 18b to the outside. That is, the disc holding mechanism C1 does not hold the optical disc D.

Elevating Mechanism C2:

Next, the elevating mechanism C2 that can elevate and lower the disc holding mechanism C1 will be described with reference to FIGS. 7A and 7B. As illustrated, the elevating mechanism C2 is generally composed of a supporting shaft 28 to support the disc holding mechanism C1 such that it can be freely moved up and down, a motor 30 located near the lower end of the supporting shaft 28 as a driving means, a pulley 31 fixed to the output shaft of the motor 30, a pulley 33 joined to the pulley 31 through a belt 32, a pulley 35 joined to the pulley 33 through a gear train 34, a pulley 36 rotatably provided near the upper end of the supporting shaft 28 and a belt 37 fixed to the disc holding mechanism C1 and which is extended between the pulleys 35 and 36. Then, when the motor 30 is energized, driving force of this motor 30 is transmitted through respective elements to drive the belt 37, whereby the disc holding mechanism C1 secured to the belt 37 is raised or lowered.

Figure 7A:
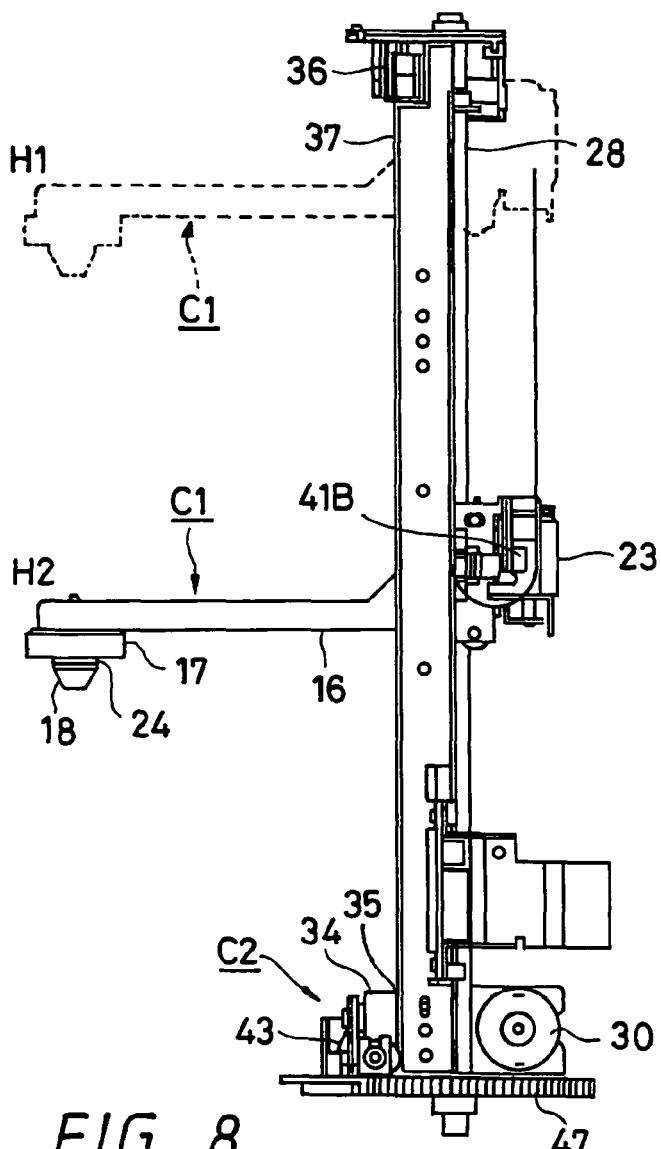
FIGS. 7A and 7B are side views to which reference will be made in explaining an elevating mechanism of the disc processing apparatus, respectively.
Figure 7B:
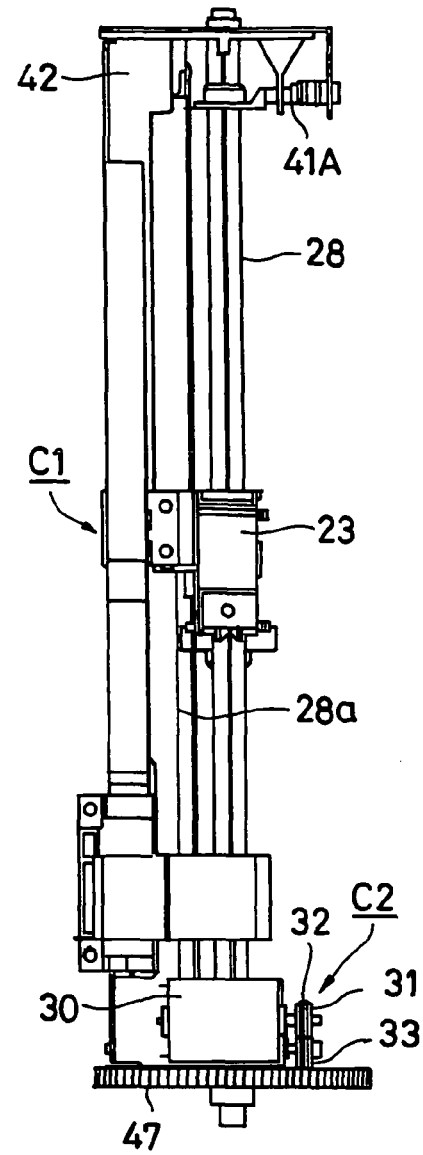

Also, as shown in FIGS. 7A and 7B, the elevating mechanism C2 is provided with a height position detecting means 41 consisting of a photointerruptor 41A secured near the upper end of the supporting shaft 28 and a photointerruptor 41B secured to the loader arm 16. The photointerruptor 41A detects the disc holding mechanism C1 to generate an ON signal (energizing signal) when the disc holding mechanism C1 is moved to a height position H1 shown by phantom in FIG. 7A. The photointerruptor 41B detects a light-shielding portion 42a, which is provided on only half of the lower side of a bracket 42, to generate an energizing signal.

In consequence, the height detecting means 41 detects by the energizing signal from the photointerruptor 41A that the disc holding mechanism C1 is placed at the height position H1 and it detects by detecting that the signal from the photointerruptor 41B is switched from ON to OFF that the disc holding mechanism C1 is placed at height position H2. Also, when the photointerruptor 41B generates an OFF signal (de-energizing signal), the height position detecting means 41 can detect that the disc holding mechanism C1 is placed between the height position H1 and the height position H2. When the photointerruptor 41B generates the energizing signal, the height position detecting means 41 can detect that the disc holding mechanism C1 is located at the position under the height position H2.

The height position H1 is higher than the collecting stacker 6 and is also higher than the disc tray 13a of the thermal transfer type printer 13. In the state in which the disc holding mechanism C1 is located at the height position H1, the disc holding mechanism C1 is swingably moved between the position on the collecting stacker 6 and the position on the disc tray 13a by the swing mechanism C3 which will be described later on. Further, the height position H2 is lower than the collecting stacker 6, higher than the supplying stacker 5 and higher than the disc trays 10a and 11a of the optical disc drives 10 and 11. In the state in which the disc holding mechanism C1 is located at the height position H2, the disc holding mechanism C1 is swingably moved between the position of the supplying stacker 5 and the position on the disc trays 10a and 11a by the swing mechanism C3 which will be described later on.

Also, a rotary encoder 45 integrally fixed to the pulley 33 and which is composed of a slit plate 43 and a photointerruptor (not shown) is provided near the lower end of the supporting shaft 28. Since this rotary encoder 45 outputs pulses when the slit plate 43 is rotated, the rotary encoder 45 outputs pulses during the elevating mechanism C2 is energized to raise or lower the disc holding mechanism C1 and it does not output pulses during the disc holding mechanism C1 is neither raised nor lowered.

Accordingly, while the rotary encoder 45 is outputting pulses within a predetermined time T1 during the disc holding mechanism C1 holding the optical disc D is being lowered by the elevating mechanism C2, it can be judged that the disc holding mechanism C1 is being lowered. Also, while the rotary encoder 45 is ceased outputting pulses within the predetermined time T1 during the disc holding mechanism C1 holding the optical disc D is being lowered by the elevating mechanism C2, it can be judged that the optical disc D held by the disc holding mechanism C1 comes in contact with any of the disc trays 10a, 11a and 13a so that the lowering operation of the disc holding mechanism C1 is halted.

Specifically, in the disc processing apparatus according to the embodiment of the present invention, in the state in which the disc holding mechanism C1 holding the optical disc D is being lowered, it is possible to detect based on a time interval of pulses generated from the rotary encoder 45 whether or not the optical disc D and the disc tray are brought in contact with each other when the optical disc D is held on the disc tray.

Also, it is possible to detect the operation amount of the elevating mechanism C2 and the movement amount of the disc holding mechanism C1 by counting the number of pulses outputted from the rotary encoder 45.

Figure 8:
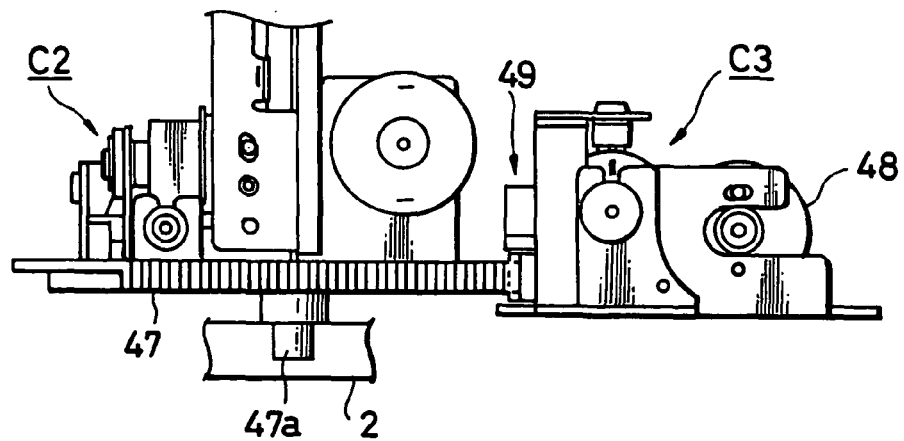
FIG. 8 is a side view to which reference will be made in explaining a swing mechanism of the disc processing apparatus.

Swing Mechanism C3:

Next, the swing mechanism C3 to swing the disc holding mechanism C1 and the elevating mechanism C2 will be described with reference to FIG. 8. As shown in FIG. 8, the swing mechanism C3 is generally composed of a rotary base 47 provided Ion the housing 2, a motor 48 serving as a drive means and a transmission mechanism 49 for transmitting driving force of the motor 48 to the rotary base 47. The rotary base 47 supports the disc holding mechanism C1 and the elevating mechanism C2 and it is provided so as to become rotatable about a shaft portion 47a. Then, when the motor 48 is energized, driving force of the motor 48 is transmitted through the transmission mechanism 49 to the rotary base 47, thereby rotating the disc holding mechanism C1 and the elevating mechanism C2 supported on the rotary base 47.

Figure 9A:
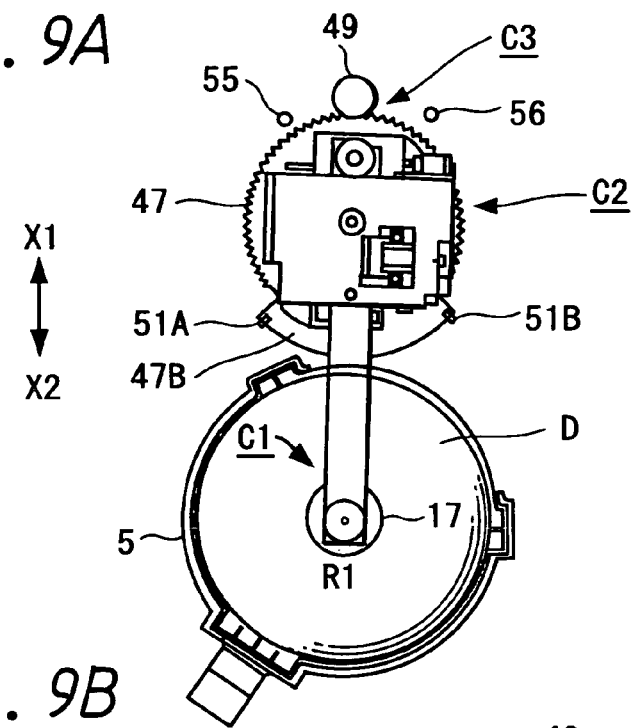
FIGS. 9A, 9B and 9C are plan views to which reference will be made in explaining the swing mechanism of the disc processing apparatus, respectively.
Figure 9B:
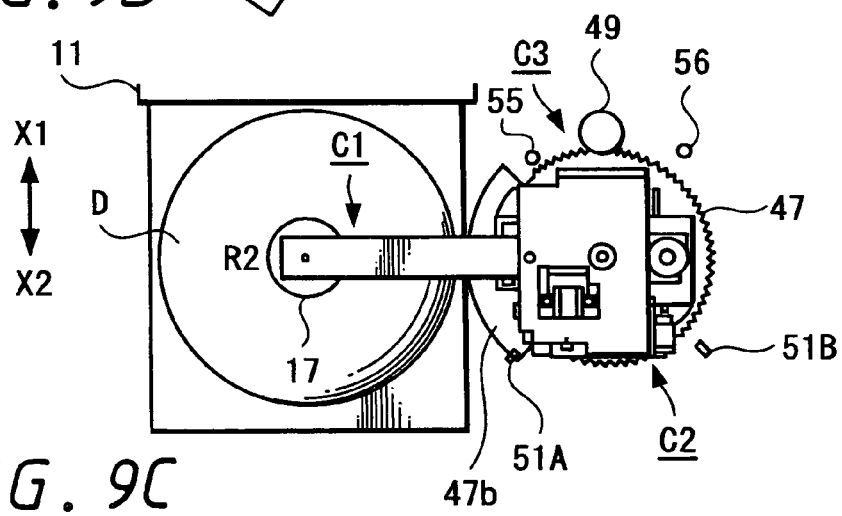
Figure 9C:
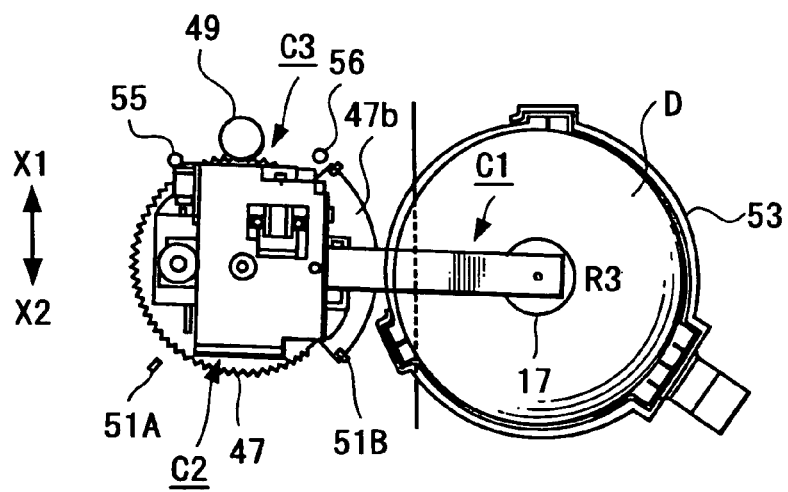

Also, as shown in FIGS. 9A to 9C, the swing mechanism C3 includes a fan-shaped light-shielding portion 47b provided on the rotary base 47 and a rotation position detecting means 51 secured to the housing 2 and which is composed of two photointerruptors 51A and 51B that detect the light-shielding portion 47b to generate an energizing signal.

When the signals from the two photointerruptors 51A and 51B are both in the ON-state, it is detected by the rotation position detecting means 51 that the disc holding mechanism C1 supported on the rotary base 47 is located at rotation position R1 shown in FIG. 9A. When the disc holding mechanism C1 is located at the rotation position R1, the center of the clamp head 17 is substantially aligned with the centers of the supplying stacker 5 and the collecting stacker 6 in the vertical direction.

Also, when the rotary base 47 is rotated in the counter-clockwise direction to energize the photointerruptor 51A in the state under which the signals from the two photointerruptorts 51A and 51B are both in the OFF-state, it is detected by the rotation position detecting means 51 that the disc holding mechanism C1 supported on the rotary base 47 is located at rotation position R2 shown in FIG. 9B. When the disc holding mechanism C1 is located at the rotation position R2, the center of the clamp head 17 is aligned with the centers of the disc trays 10a, 11a and 13a in the vertical direction.

Also, when the rotary base 47 is rotated in the clockwise direction to energize the photointerruptor 51B in the state under which the signals from the two photointerruptors 51A and 51B are both in the OFF-state, it is detected by the rotation position detecting means 51 that the disc holding mechanism C1 supported on the rotary base 47 is located at rotation position R3 shown in FIG. 9C. In the disc processing apparatus 1 according to the embodiment of the present invention, an increased stacker 53 can be optionally attached to the right-hand side of the apparatus. When the disc holding mechanism C1 is located at the rotation position R3, the center of the clamp head 17 is substantially aligned with that of the increased stacker 53 in the vertical direction.

As shown in FIGS. 9A to 9C, stoppers 55 and 56 are fixed on the housing 2. When the stoppers 55 and 56 are brought in contact both ends of the light-shielding portion 47b, they may limit a rotation range of the rotary base 47.

The above-mentioned optical disc drives 10 and 11, thermal transfer type printer 13, plunger solenoid 23, microswitch 25, motor 30, photointerruptors 41A and 41B, photointerruptor 44, rotary encoder 45, motor 48 and photointerruptors 51A and 51B are electrically connected to the control unit 8 and they may be operated based on electrical control of the control unit 8. A disc processing process done by the disc processing apparatus 1 will hereinafter be outlined.

Outline of Disc Processing Process:

When the disc processing is started in the state in which unprocessed optical discs D are housed in the housing portion 5a of the supplying stacker 5 in the stacked state and the disc holding mechanism C1 is located at the height position H2 and the rotation position R1, first, the elevating mechanism C2 lowers the disc holding mechanism C1 and the disc holding mechanism C1 holds the optical disc D which is located at the uppermost portion of the supplying stacker 5. Then, after the elevating mechanism C2 has elevated the disc holding mechanism C1 to the height position H2, the swing mechanism C3 swings the disc holding mechanism C1 to the rotation position R2. At that time, the optical disc drive 10 ejects the disc tray 10a.

Subsequently, the elevating mechanism C2 lowers the disc holding mechanism C1 to place the optical disc D held on the disc holding mechanism C1 on the disc tray 10a. Then, after the elevating mechanism C2 elevated the disc holding mechanism C1, the optical disc drive 10 accommodates therein the disc tray 10a to load the optical disc D and energizes the recording portion to effect information record processing on the optical disc D. When the optical disc drive 10 is in use, the optical disc drive 11 is available. That is, in the disc processing apparatus 1 according to this embodiment, a disc processing speed can be increased by operating two optical disc drives in parallel to each other.

After the optical disc drive 10 has finished the information record processing on the optical disc D, the optical disc drive 10 ejects the disc tray 10a again, the elevating mechanism C2 lowers the disc holding mechanism C1 and the disc holding mechanism C1 holds the optical disc D. Then, the elevating mechanism C2 elevates the disc holding mechanism C1 to the height position H1 and the optical disc drive 10 accommodates therein the disc tray 10a.

Subsequently, after the thermal transfer type printer 13 ejected the disc tray 13a, the elevating mechanism C2 lowers the disc holding mechanism C1 to place the optical disc D held by the disc holding mechanism C1 on the disc tray 13a. Then, after the elevating mechanism C2 elevated the disc holding mechanism C1, the thermal transfer type printer 13 accommodates therein the disc tray 13a to load the optical disc D and energizes the printing unit to effect print processing on the optical disc D.

After the thermal transfer type printer 13 has finished the print processing on the optical disc D, the thermal transfer type printer 13 ejects the disc tray 13a again, the elevating mechanism C2 lowers the disc holding mechanism C1 and the disc holding mechanism C1 holds the optical disc D. Then, after the elevating mechanism C2 has elevated the disc holding mechanism C1 to the height position H1, the swing mechanism C3 swings the disc holding mechanism C1 to the rotation position R1, whereby the optical disc D held by the disc holding mechanism C1 is placed just above the collecting stacker 6. Subsequently, the disc holding mechanism C1 releases the optical disc D from being held and hence the processed optical disc D is accommodated within the collecting stacker 6.

The outline of the disc processing process has been described so far. The disc processing apparatus 1 according to the embodiment of the present invention is particularly characterized in that (1) when the optical discs D are conveyed from the supplying stacker 5 by the disc holding mechanism C1, if the optical discs D are sticking to each other within the supplying stacker 5, then such sticking optical discs D are separated from each other by a separating means and that (2) even when the sticking optical discs D may not be separated from each other by the separating means so that the disc holding mechanism C1 holds a plurality of optical discs D and conveys them to the disc trays, such mis-operation is detected and the conveyed optical discs D are returned to the supplying stacker 5. Therefore, these operations will be described subsequently in detail.

Figure 10:
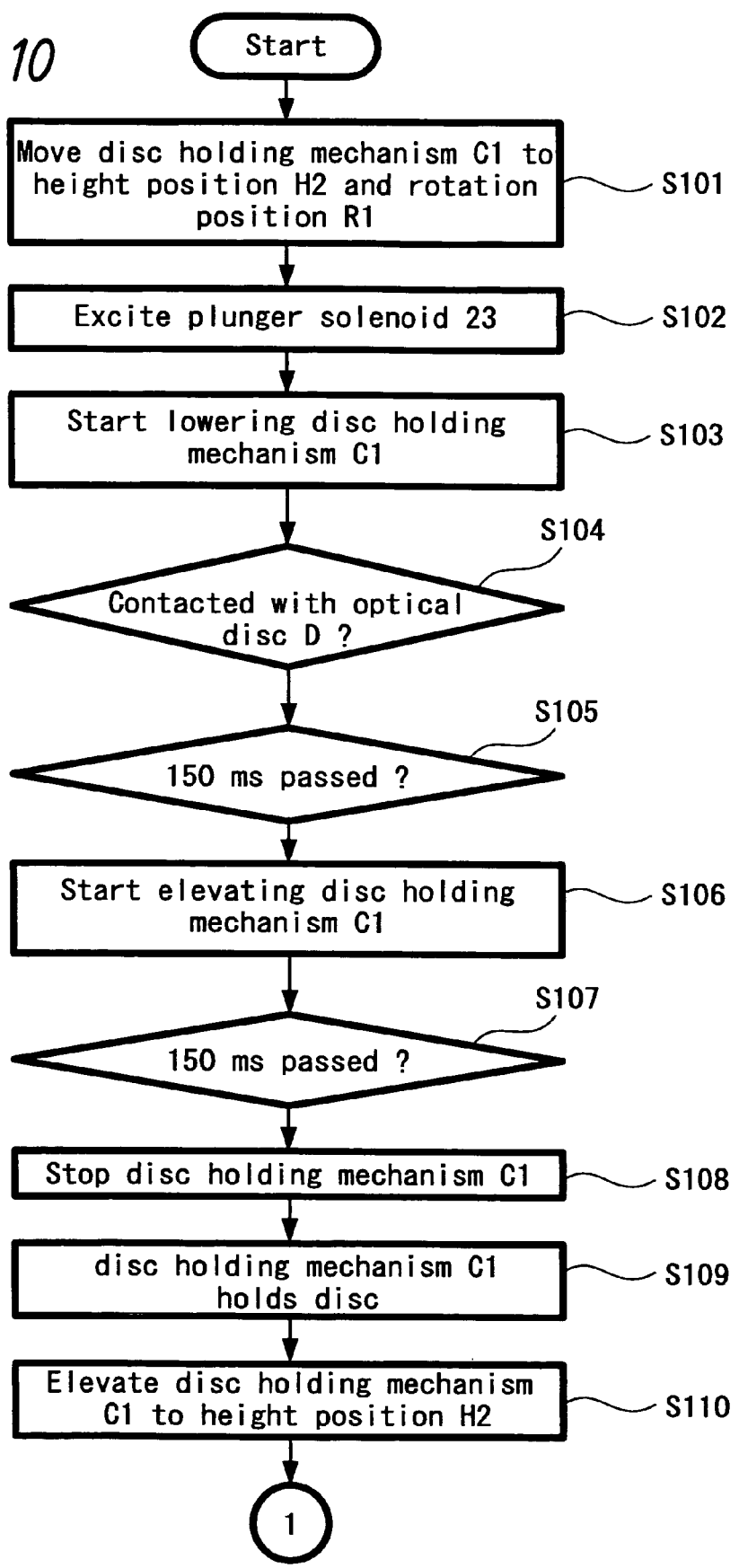
FIG. 10 is a flowchart to which reference will be made in explaining disc conveying operations.
Figure 11:
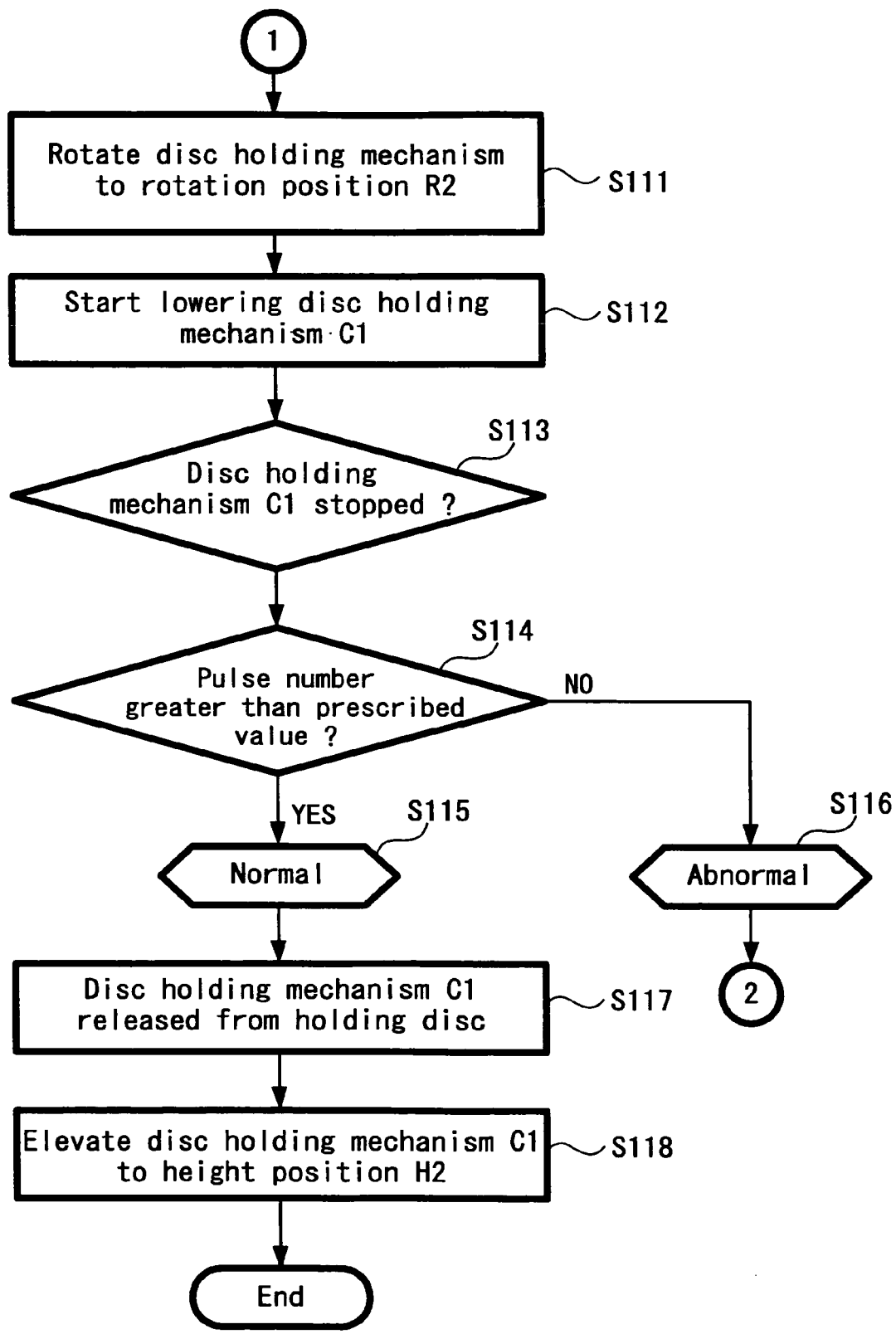
FIG. 11 is a flowchart to which reference will be made in explaining disc conveying operations.
Figure 12:
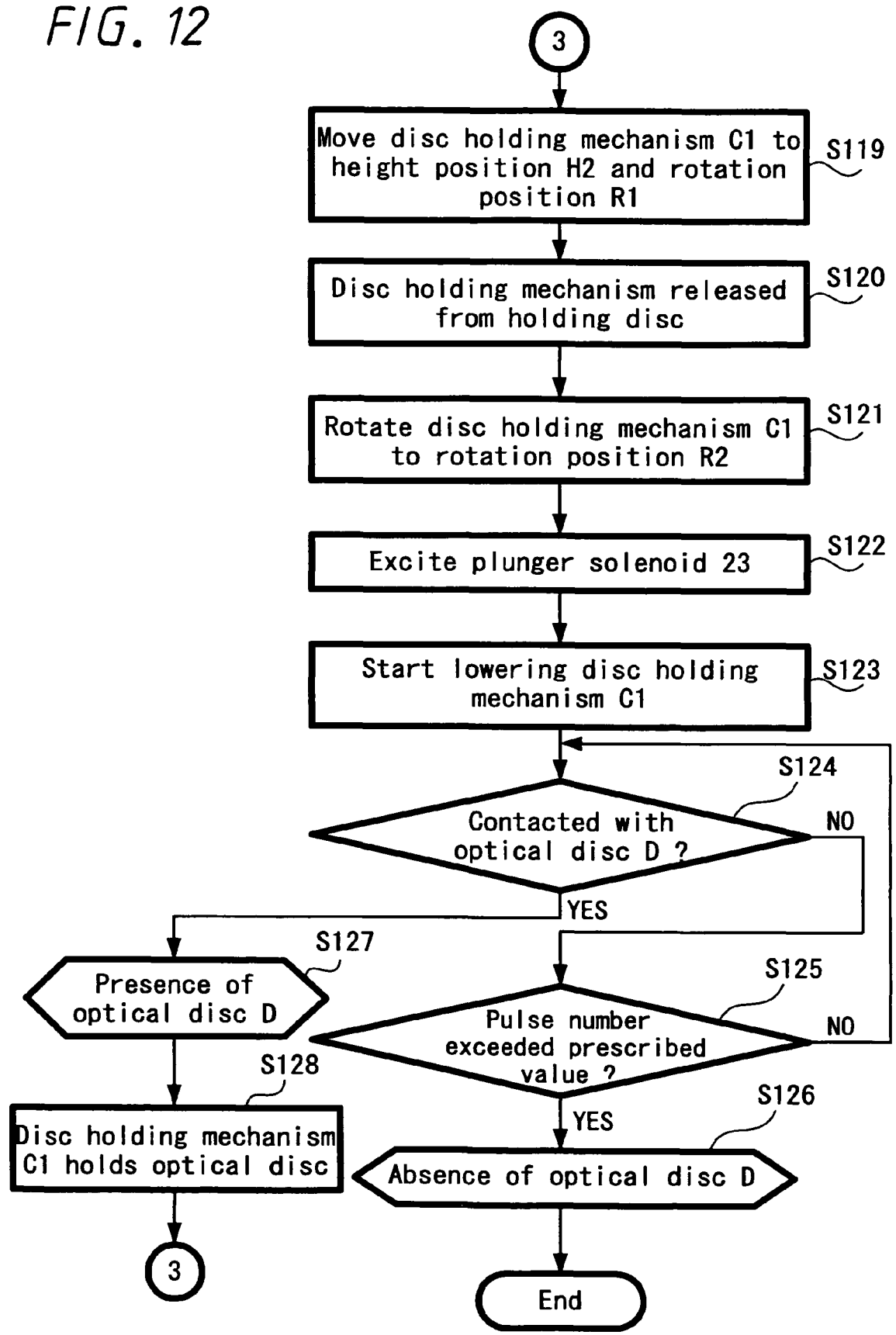
FIG. 12 is a flowchart to which reference will be made in explaining disc conveying operations.

FIGS. 10 to 12 are flowcharts of a control program executed by the control unit (control means) 8 when the optical disc D is unloaded from the supplying stacker 5 and placed on the disc tray 10a of the optical disc drive 10. This control program is stored in a ROM (read-only memory), not shown, provided in the control unit 8.

Referring to FIG. 10 and following the start of operation, the elevating mechanism C2 and the swing mechanism C3 are energized and the disc holding mechanism C1 is moved to the height position H2 and the rotation position R1 at a step S101. If the disc holding mechanism C1 is already placed at the height position H2 and the rotation position R1, then control is not made at the steps S101.

Figure 13:
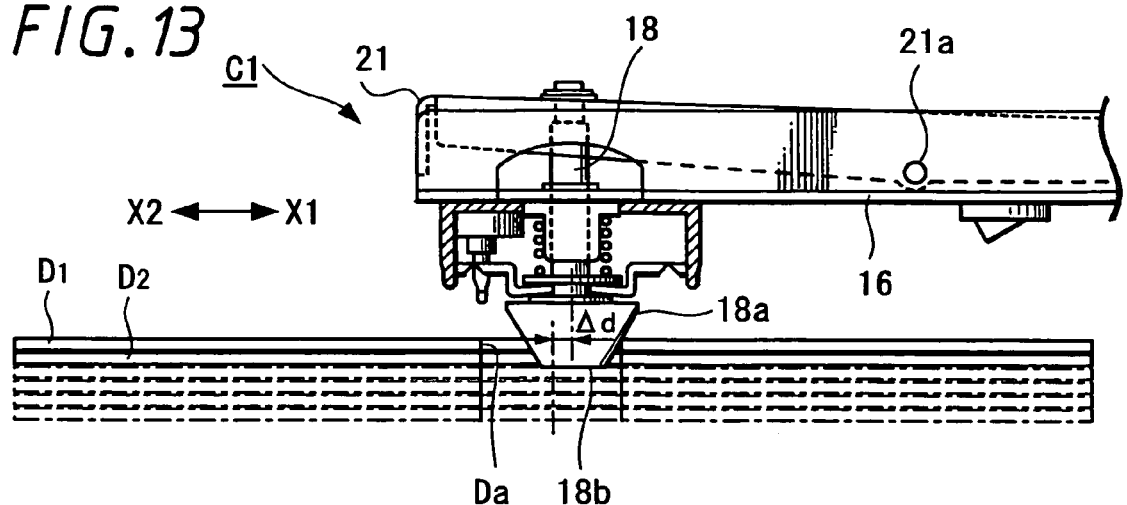
FIG. 13 is a schematic diagram showing a first process of the operation state of the disc holding mechanism.

Then, control goes to the next step S102, whereat the plunger solenoid 23 of the disc holding mechanism C1 is excited, whereby the disc holding portion 17b is displaced in the direction in which it may approach the center of the clamp head 17 and thereby prevented from being projected from the fitting portion 18b to the outside as shown in FIGS. 6B and 13.

Then, control goes to the next step S103, whereat the motor 30 of the elevating mechanism C2 is energized so that the elevating mechanism C2 lowers the disc holding mechanism C1. Then, the tip end of the disc holding mechanism C1 enters the supplying stacker 5 and the fitting portion 18b of the movable head 18 is fitted into the central hole Da of the optical disc D shortly as shown in FIG. 13. At that time, in the disc processing apparatus 1 according to the embodiment of the present invention, as shown in FIG. 13, since the respective members are located such that the center of the fitting portion 18b may be displaced from the center of the optical disc D (D1 to D6) within the supplying stacker 5 by a distance Δd in the X1 direction, the tapered portion 18a of the movable head 18 is brought in contact with the central hole Da of the optical disc D.

Figure 14:
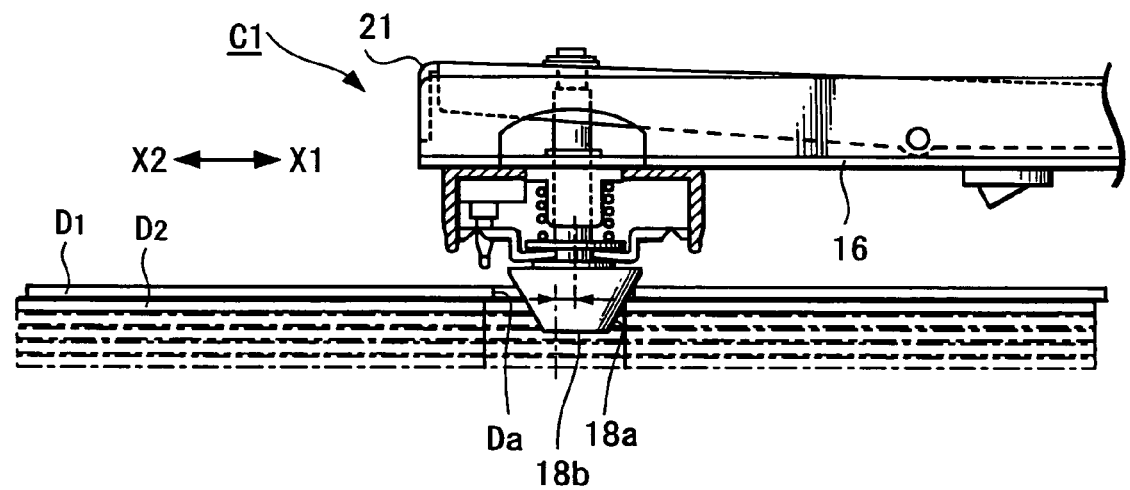
FIG. 14 is a schematic diagram showing a second process of the operation state of the disc holding mechanism.

When the disc holding mechanism C1 is lowered more, as shown in FIG. 14, the tapered portion 18a of the movable head 18 pushes the optical disc D1, which is located at the uppermost portion of the supplying stacker 5, in the arrow X1 direction, whereby the optical disc D1 is slid in the arrow X1 direction and the optical disc D1 located at the uppermost portion of the supplying stacker 5 is separated from the optical disc D2 located just under the optical disc D1.

Further, as the disc holding mechanism C1 is being lowered, the tapered portion 18a of the movable head 18 pushes and slides the optical discs D stacked within the supplying stacker 5 one by one from the above in the arrow X1 direction and thereby the optical discs D may be separated from each other.

As described above, in the disc processing apparatus according to the embodiment of the present invention, the tapered portion 18a of the disc holding mechanism C1 presses the peripheral edge of the optical disc D within the supplying stacker 5 to apply force directed in the direction substantially parallel to the disc surface to the optical disc D that is located at the uppermost portion to separate the optical disc D located at the uppermost portion from the optical disc D located just under the above optical disc D. According to this arrangement, most of the sticking optical discs D can be separated from each other.

Figure 15:
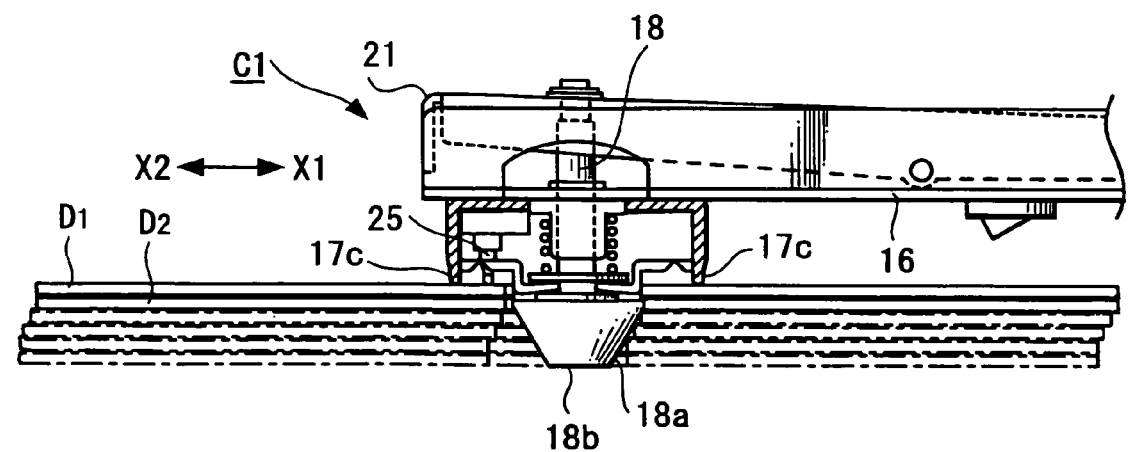
FIG. 15 is a schematic diagram showing a third process of the operation state of the disc holding mechanism.

Then, when the disc holding mechanism C1 reaches the state shown in FIG. 15, the disc contact portion 17c of the clamp head 17 is brought in contact with the optical disc D1.

At the same time the microswitch 25 is pressed against the upper surface of the optical disc D, it is determined at a step S104 that the microswitch 25 is turned ON.

In this embodiment, the microswitch 25 is located such that it may outputs the energizing signal when the disc holding mechanism C1 reaches the position at which it can hold the optical disc D. Thus, the elevating mechanism C2 can be stopped immediately and the disc holding mechanism C1 can hold the optical disc D. However, in the disc processing apparatus 1 according to the embodiment of the present invention, at steps S105 to S108 which will be described later on, the disc holding mechanism C1 is lowered and then raised, whereby force directed in the direction substantially perpendicular to the disc surface is applied to the optical disc D to separate the sticking optical discs D from each other.

To be concrete, it is determined at the next decision step S105 by a timer built-in the control circuit 8 whether or not a time elapsed since the microswitch 25 was turned on is 150 ms. During the elapsed time reaches 150 ms, the disc holding mechanism C1 is lowered by the elevating mechanism C2, whereby the disc contact portion 17c of the clamp head 17 pushes the optical disc D in the lower direction. Then, if the elapsed time reaches 150 ms as represented by a YES at the decision step S105, then control goes to a step S106, whereat the motor 30 is driven in the reverse direction so that the disc holding mechanism C1 is raised by the elevating mechanism C2.

When the disc holding mechanism C1 starts being raised by the elevating mechanism C2 at the step S106, it is determined at the next decision step S107 by a timer built-in the control unit 8 whether or not a time elapsed since the disc holding mechanism C1 started being raised is 150 ms. During the elapsed time reaches 150 ms, the disc holding mechanism C1 is being raised by the elevating mechanism C2. If the elapsed time reaches 150 ms as represented by a YES at the decision step S107, then control goes to a step S108, whereat the motor 30 of the elevating mechanism C2 is de-energized to stop the disc holding mechanism C1.

Since respective components of the disc holding mechanism C1 and the elevating mechanism C2 are assembled to the disc processing apparatus 1 with movement margins (clearances), drag generated when the optical disc D is pushed in the downward by the disc contact portion 17c of the clamp head 17 may be absorbed as the respective components are displaced by the displacement amounts corresponding to these clearances. Thus, the disc holding mechanism C1 and the elevating mechanism C2 can be protected from being damaged by operations to apply pushing force to the optical disc D.

As described above, in the disc processing apparatus 1 according to the embodiment of the present invention, the disc contact portion 17c of the disc holding mechanism C1 downwardly presses the optical disc D located at the uppermost portion of the supplying stacker 5 to apply force directed in the direction substantially vertical to the disc surface to the optical disc D located at the uppermost portion, thereby resulting in the optical disc D located at the uppermost portion being separated from the optical disc D located just under the above optical disc D. As a result, most of the sticking optical discs D can be separated from each other.

Figure 16:
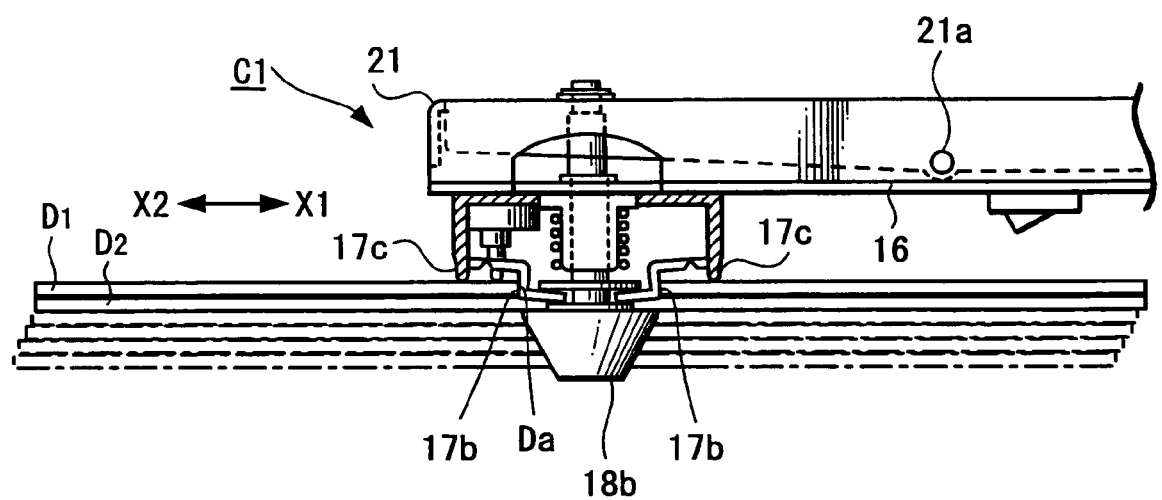
FIG. 16 is a schematic diagram showing a fourth process of the operation state of the disc holding mechanism.

At the next step S109, the plunger solenoid 23 of the disc holding mechanism C1 is released from being excited, whereby the disc holding portion 17b is displaced in the direction in which it is spaced apart from the center of the clamp head 17, projected from the fitting portion 18b to the outside and thereby brought in contact with the central hole Da of the optical disc D1 located at the uppermost portion as shown in FIGS. 6A and 16. Thus, the disc holding mechanism C1 is placed in the state in which it is holding the optical disc D1 located at the uppermost portion.

At the next step S110, the motor 30 is driven in the reverse direction to energize the elevating mechanism C2 to raise the disc holding mechanism C1 to the height position H2. Then, at a step S111, the motor 48 is driven to energize the swing mechanism C3 to swing the disc holding mechanism C3 to the rotation position R2. Also, the disc tray 10a is ejected from the optical disc drive 10, whereby the optical disc D held by the disc holding mechanism C1 is placed just above the disc tray 10a of the optical disc drive 10.

At the next step S112, the motor 30 is driven to energize the elevating mechanism C2 to lower the disc holding mechanism C1. Then, control goes to the next decision step S113, whereat it is determined by monitoring the output from the rotary encoder 45 whether or not the lower surface of the optical disc D held by the disc holding mechanism C1 contacts with the disc tray to stop descending of the disc holding mechanism C1. If it is determined by detecting that no pulse is outputted from the rotary encoder 45 after a predetermined time T1 was passed that the lowering operation of the disc holding mechanism C1 is stopped, then control goes to the next decision step S114.

With respect to a movement distance in which the disc holding mechanism C1 is moved during the disc holding mechanism C1 starts lowering the position of the height position H2 at the step S112 and it is stopped at the step S113, the movement distance required when the disc holding mechanism C1 holds the two optical discs D becomes shorter than that required when the disc holding mechanism C1 holds one optical disc D by a length corresponding to the thickness of one optical disc D.

In the disc processing apparatus 1 according to the embodiment of the present invention, this movement distance may be detected based on the number of pulses outputted from the rotary encoder 45. If the number of pulses outputted from the rotary encoder 45 is less than a prescribed value, then it is determined that the disc holding mechanism C1 has held and conveyed a plurality of optical discs D at the same time.

Specifically, the control unit 8 stores therein in advance reference values N1 and N2 which were determined based on the number of pulses outputted from the rotary encoder 45 when the disc holding mechanism C1 normally conveys one optical disc D from the height position H2 to the disc tray. N1 is the reference value required when the optical disc D is conveyed to the disc tray 10a and N2 is the reference value required when the optical disc D is conveyed to the disc tray 11a.

Then, the number of pulses outputted from the rotary encoder 45 when the optical disc D is conveyed in actual practice is counted. If the counted number is less than the reference value N1 (or N2), then it is determined that the disc holding mechanism C1 has held and conveyed a plurality of optical discs D at the same time.

The above-mentioned operations will be described with reference to the flowcharts of FIGS. 11 and 12.

Referring to FIG. 11, it is determined at the decision step S114 whether or not the number of pulses outputted from the rotary encoder 45 during the disc holding mechanism C1 starts being lowered from the height position H1 at the step S112 and stopped at the step S113 is greater than the prescribed value N1. If the number of pulses outputted from the rotary encoder 45 is greater than the prescribed value N1 as represented by a YES at the decision step S114, then control goes to a step S115. If on the other hand the number of pulses outputted from the rotary encoder 45 is smaller than the prescribed value N1 as represented by a NO at the decision step S114, then it is determined that more than two optical discs D are conveyed at the same time. Hence, control goes to a step S116.

When control goes from the step S114 to the step S116, it is determined that more than two optical discs D are conveyed and that abnormal optical disc conveying operation is carried out. Then, control goes to steps S119 to S128, which will be described later on, in which operations for returning the conveyed optical discs D to the supplying stacker 5 will be carried out.

Referring to FIG. 12, at the step S119, the optical disc D held by the disc holding mechanism C1 is not released and the disc holding mechanism C1 is raised to the height position H2 by the elevating mechanism C2. Subsequently, the swing mechanism C3 swings the disc holding mechanism C1 to the rotation position R1 to place the disc holding mechanism C1 on the supplying stacker 5. Then, control goes to a step S120, whereat the plunger solenoid 23 is driven during a predetermined time to release the optical disc D from being held by the disc holding mechanism C1 and hence the optical disc D is returned to the supplying stacker 5.

Subsequently, it is checked whether or not the optical disc D is left on the disc tray. If the optical disc D remains on the disc tray, then work for returning this remaining optical disc D to the supplying stacker 5 is carried out. Specifically, at a step S121, the disc holding mechanism C1 is swung to the rotation position R2 by the swing mechanism C3. Then, control goes to a step S122, whereat the plunger solenoid 23 is excited and the disc holding mechanism C1 is lowered by the elevating mechanism C2 at a step S123.

Then, control goes to the next decision step S124, whereat it is determined based on the status of the output from the microswitch 25 whether or not the disc holding mechanism C1 comes in contact with the optical disc D.

If the disc holding mechanism C1 is not brought in contact with the optical disc D as represented by a NO at the decision step S124, then control goes to the next decision step S125, whereat it is determined whether or not the number of pulses outputted from the rotary encoder 45 after the disc holding mechanism C1 started descending at the step S123 is greater than a prescribed value N3. The prescribed value N3 is a value determined based on the number of pulses outputted from the rotary encoder 45 during the disc holding mechanism C1, which holds no optical disc D, is started being lowered from the height position H2 and the microswitch 25 of the disc holding mechanism C1 is fitted into the recess hole bored at the center of the disc tray 10a. This reference value N3 is stored in the control unit 8 in advance.

Then, if the disc holding mechanism C1 is not brought in contact with the optical disc D as represented by a NO at the decision step S124 and if the number of pulses outputted from the rotary encoder 45 is greater than the prescribed value N3 as represented by a YES at the decision step S125, then it is determined that no optical disc D remains on the disc tray, and control goes to a step S126. If the disc holding mechanism C1 is brought in contact with the optical disc D as represented by a YES at the decision step S124 before the number of pulses outputted from the rotary encoder 45 exceeds the prescribed value N3, then it is determined that the optical disc D remains on the disc tray, and control goes to a step S127.

When control goes from the step S124 to the step S127, the plunger solenoid 23 is released from being excited and the disc holding mechanism C1 holds the optical disc D at a step S128. Then, after this optical disc D was returned to the supplying stacker 5 at the steps S119 and S120, it is checked at the steps S121 to S125 whether or not another optical disc D remains on the disc tray. Specifically, loop work formed of the steps S124, S127, S128, S119 to S124, in that order, is repeated until the optical disc D is removed from the disc tray.

When control goes from the step S125 to the step S126, the operation is returned to the ordinary conveying operation of the optical disc D.

As described above, the distance in which the disc holding mechanism C1 is moved during it is detected based on the output from the rotary encoder (conveyance completion detecting means) 45 at the step S113 that the lower surface of the optical disc D is brought in contact with the disc tray (disc holder portion) after it was detected that the disc holding mechanism C1 was located at the height position H2 and the rotation position R2 by the height position detecting means 41 and the rotation position detecting means (reference position detecting means) 51 at the steps S110 and S111 is detected from the number of pulses outputted from the rotary encoder 45 during this time period. If this distance (that is, number of pulses) is less than the prescribed value, then it is determined that the disc holding mechanism C1 has held and conveyed a plurality of disc-like recording mediums at the same time and the thus held optical discs D are returned to the supplying stacker 5. Therefore, it is possible to prevent a plurality of optical discs from being loaded onto the optical disc drive.

While the embodiments of the present invention have been described so far, the present invention is not limited thereto and can be variously changed and modified based on technological idea of the present invention.

For example, while the disc holding mechanism C1 has the arrangement in which it can be translated between the position (rotation position R1) on the stackers 5 and 6 and the position (rotation position R2) on the disc trays 10a, 11a and 13a while it is being swung and moved as described above, the present invention is not limited thereto and the disc holding mechanism C1 may have an arrangement in which it can be slid and moved along a horizontal guide shaft.

Also, while the arrangement in which the disc holding mechanism C1 is lowered during a time period of 150 ms after the disc holding mechanism C1 was brought in contact with the optical disc D and it is elevated during the next time period of 150 ms as described above, this time period of 150 ms is determined by way of example and this time period may be properly changed in response to movement margins (clearances) among the respective components of the disc holding mechanism C1 and the elevating mechanism C2.

While the arrangement in which the amount in which the disc holding mechanism C1 is to be raised and lowered after the disc holding mechanism C1 was contacted with the optical disc D is controlled based on the elapsed time as described above, the present invention is not limited thereto and the above-mentioned amount may be controlled based on the number of pulses outputted from the rotary encoder 45. Specifically, the number of pulses outputted from the rotary encoder 45 after the microswitch 25 was turned on may be counted and the disc holding mechanism C1 may be lowered by the elevating mechanism C2 during a time period in which the number of counted pulses reaches a predetermined number (for example, 8) to thereby cause the disc contact portion 17c of the clamp head 17 to press the optical disc D downwardly. Then, when the number of counted pulses reaches the predetermined number, the motor 30 may be driven in the reverse direction to energize the elevating mechanism C2 to raise the disc holding mechanism C1. Next, the number of pulses outputted from the rotary encoder 45 after the disc holding means C1 started being elevated may be counted. If the number of the counted pulses reaches the predetermined number (for example, 8), then the motor 30 of the elevating mechanism C2 is be stopped and thereby the disc holding mechanism C1 is be stopped.

Also, while the arrangement in which the disc holding mechanism C1 is lowered by the predetermined amount to apply the force directed in the direction substantially perpendicular to the disc surface to the optical disc D to thereby separate the optical discs D from each other after the disc holding mechanism C1 was brought in contact with the optical disc D was described so far, the present invention is not limited thereto and a pulse-like drive current may be applied to the motors 30 and 48 of the elevating mechanism C2 and/or swing mechanism C3 to apply pulse-like force through the disc contact portion 17c of the disc holding mechanism C1 to the optical disc, D to thereby promote separation of the optical discs D. Alternatively, a stacker drive mechanism for sliding and moving the supplying stacker 5 or a stacker vibration applying means for vibrating the supplying stacker 5 may be provided. In the state under which the disc contact portion 17c of the disc holding mechanism C1 is brought in contact with the optical disc D, the supplying stacker 5 may be moved to apply force through the disc contact portion 17c to the optical disc D to thereby promote separation of the optical discs D.

Further, while the arrangement in which the tapered portion 18a of the disc holding mechanism C1 presses the edge of the optical disc D to apply force directed in the direction substantially parallel to the disc surface to the optical disc D to thereby separate the optical discs D from each other was described so far, the present invention is not limited thereto and the disc holding mechanism C1 in the state in which it is brought in contact with the optical disc D located at the uppermost portion within the stacker may be moved in the direction substantially parallel to the disc surface to thereby separate the optical discs D from each other.

Furthermore, while the operation mode in which when the disc holding mechanism C1 conveyed a plurality of optical discs D to the disc tray, the processing is returned to the ordinary processing after all optical discs D on the disc tray were returned to the supplying stacker 5 was described so far, the present invention is not limited thereto and the processing may be returned to the ordinary processing when it is determined that one optical disc D remains on the disc tray. Specifically, since it is possible to detect the number of optical discs D remaining on the disc tray by counting the number of pulses outputted from the rotary encoder 45 until the optical disc D on the disc tray is detected at the step S124 since the disc holding mechanism C1 has started being lowered at the step S123, if it is detected that one optical disc D remains on the disc tray, then control may go to the step S118.

According to the disc processing apparatus of the present invention, since disc-like recording medium accommodated within the stacker in the stacked state are conveyed for printing processing and the like, since a disc-like recording medium to be conveyed is separated from a disc-like recording medium located just under the above-mentioned conveyed disc-like recording medium by the separating means, it is possible to suppress the occurrence of a phenomenon in which a plurality of disc-like recording mediums is conveyed in the state in which they are stuck.

Further, since the disc processing apparatus includes the control means for detecting that the disc holding-means has held a plurality of disc-like recording mediums and controlling the disc conveying unit such that the disc conveying unit returns the thus held disc-like recording medium to the stacker, it is possible to avoid such a disadvantage in which a plurality of disc-like recording mediums is simultaneously conveyed to the disc processing unit in the state in which they stuck together so that processing in the disc processing unit is not carried out correctly.

It should be understood by those skilled in the art that various modifications, combinations, sub-combinations and alterations may occur depending on design requirements and other factors insofar as they are within the scope of the appended claims or the equivalents thereof.

What is claimed is:

1. A disc processing apparatus comprising:
   a stacker for accommodating therein a plurality of disc-like recording mediums in the stacked state;
   a disc processing unit including a disc holding portion on which a disc-like recording medium is held and effecting predetermined processing on the disc-like recording medium held on said disc holding portion;
   a disc conveying unit including a disc holding mechanism for holding a disc-like recording medium located at the uppermost portion of said stacker and conveying the thus held disc-like recording medium to said disc holding portion of said disc processing unit by moving said disc holding mechanism;
   separating means for separating said disc-like recording medium located at the uppermost portion of said stacker from a disc-like recording medium located just under said preceding disc-like recording medium; and
   control means for determining that said disc holding mechanism held and conveyed a plurality of disc-like recording mediums at the same time, when a signal count less than a predetermined value is detected by said control means.

2. A disc processing apparatus according to claim 1, wherein said separating means includes a disc contact portion which contacts with said disc-like recording medium located at said uppermost portion, said disc contact portion downwardly pressing said disc-like recording medium located at said uppermost portion to apply force directed in the direction substantially perpendicular to the disc surface to said disc-like recording medium located at said uppermost portion.

3. A disc processing apparatus according to claim 1, wherein said separating means includes a tapered portion which contacts with a peripheral edge of a disc-like recording medium located at said uppermost portion, said tapered portion pressing the peripheral edge of said disc-like recording medium located at said uppermost portion to apply force in the direction substantially parallel to the disc surface to said disc-like recording medium located at said uppermost portion.

4. A disc processing apparatus comprising:
   a stacker for accommodating a plurality of disc-like recording mediums in the stacked state;
   a disc processing unit including a disc holding portion on which a disc-like recording medium is held and effecting predetermined processing on the disc-like recording medium held on said disc holding portion;
   a disc conveying unit including a disc holding mechanism for holding a disc-like recording medium located at the uppermost portion of said stacker and conveying the thus held disc-like recording medium to said disc holding portion of said disc processing unit by moving said disc holding mechanism; and
   control means for detecting that said disc holding mechanism holds a plurality of disc-like recording mediums within said stacker at the same time and controlling said disc conveying unit such that said disc conveying unit returns the thus held disc-like recording mediums to said stacker, wherein when said control means determines a signal count less than a prescribed value, said control means determines that said disc holding mechanism held and conveyed a plurality of disc-like recording mediums at the same time.

5. A disc processing apparatus according to claim 4, further comprising:
reference position detecting means for detecting that said disc holding mechanism is located at a predetermined position;
conveyance completion detecting means for detecting that the lower surface of the disc-like recording medium held by said disc holding mechanism contacts with said disc holding portion and wherein said control means detects a distance in which said disc holding mechanism is moved after said conveyance completion detecting means detected that the lower surface of the disc-like recording medium and said disc holding portion are contacted with each other since said reference position detecting means has detected that said disc holding mechanism was located at the predetermined position.

6. A disc processing apparatus comprising:
a stacker for accommodating therein a plurality of disc-like recording mediums in the stacked state;
a disc processing unit including a disc holding portion on which a disc-like recording medium is held and effecting predetermined processing on the disc-like recording medium held on said disc holding portion;
a disc conveying unit including a disc holding mechanism for holding a disc-like recording medium located at the uppermost portion of said stacker and conveying the thus held disc-like recording medium to said disc holding portion of said disc processing unit by moving said disc holding mechanism, the disc holding mechanism comprising a plurality of disc holding portions that are positioned and configured to be each displaced radially outwardly to contact with a peripheral edge of a central hole of said disc-like recording medium located at said uppermost portion to thereby hold said disc-like recording medium;
separating means for separating said disc-like recording medium located at the uppermost portion of said stacker from a disc-like recording medium located just under said preceding disc-like recording medium; and
wherein said separating means includes a disc contact portion which contacts with said disc-like recording medium located at said uppermost portion, said disc contact portion downwardly pressing said disc-like recording medium located at said uppermost portion to apply force to said disc-like recording medium located at said uppermost portion, said force directed in the direction substantially perpendicular to the disc surface.

7. A disc processing apparatus comprising:
a stacker for accommodating therein a plurality of disc-like recording mediums in the stacked state;
a disc processing unit including a disc holding portion on which a disc-like recording medium is held and effecting predetermined processing on the disc-like recording medium held on said disc holding portion;
a disc conveying unit including a disc holding mechanism for holding a disc-like recording medium located at the uppermost portion of said stacker and conveying a held disc-like recording medium to said disc holding portion of said disc processing unit by moving said disc holding mechanism;
separating means for separating said held disc-like recording medium located at the uppermost portion of said stacker from a disc-like recording medium located just under said preceding disc-like recording medium after said separating means is lowered from a position above said stacker; and
wherein said separating means includes a fitting portion in which a tapered portion which contacts with a peripheral edge of a central hole of said disc-like recording medium located at said uppermost portion is formed and which is fitted into said central hole, a center of said fitting portion being displaced from a center of a plurality of disc-like recording mediums accommodated in said stacker, and
wherein when said separating means is lowered, said tapered portion pushes said peripheral edge of said disc-like recording medium located at said uppermost portion to apply force in the direction substantially parallel to the disc surface to said disc-like recording medium located at said uppermost portion and slides said disc-like recording medium located at said uppermost portion in said direction substantially parallel to the disc surface.

* * * * *